Sept. 18, 1962     C. F. PROUDMAN     3,054,602

APPARATUS FOR TREATMENT OF SEWAGE

Filed May 5, 1958

INVENTOR.
CHESTER F. PROUDMAN
BY Mathias R. Kondolf
ATTORNEY

United States Patent Office 3,054,602
Patented Sept. 18, 1962

3,054,602
APPARATUS FOR TREATMENT OF SEWAGE
Chester F. Proudman, 17 Lake View Ave.,
Park Ridge, N.J.
Filed May 5, 1958, Ser. No. 732,883
3 Claims. (Cl. 261—21)

This invention relates to an improved apparatus for use in the treatment of sewage.

In the customary activated sludge treatment of sewage, the liquid component, or primary effluent, flows into open compartments where a quantity of activated sludge is introduced for the purpose of "seeding" or starting the growth of aerobic bacteria. The efficient propagation of this bacteriological action is the most important objective in the treatment of sewage.

The environment in which the life cycle of the aerobic bacteria takes place is of prime importance. In order to furnish the oxygen necessary to maintain and vitalize the bacteria, air is supplied to the liquid effluent in the compartments. The quantity of air, its distribution and direction of flow relative to the flow of the liquid effluent, the area of surface contact of air with the liquid effluent and the control of "bulking" or agglomeration of sludge during the treatment, govern to a great extent the efficiency of a sewage disposal plant.

The general object of this invention is to provide apparatus for the control of both the liquid and gaseous elements involved in the process, to secure improved efficiency in the treatment of sewage.

A principal object of the invention is to provide a series of closed compartments connected in series to form a path for the continuous flow of sewage effluent, and comprising in combination with said compartments suitably disposed inlet and outlet troughs, mixing channels, outlet dams with level aprons and sludge dispersing means; all of which serve to promote improved aeration and more efficient and uniform purification of all of the effluent passing through said apparatus. Improved control of the fresh air supply and of the air and gas mixtures formed during the operation of the apparatus is also provided.

A further object of the invention is to provide, in a continuous flow apparatus, a path for the effluent through scrubbing and mixing channels at increased velocity, under and around relatively sharp partition members to disperse agglomerated sludge and over outlet dams with level aprons in relatively shallow depth of flow to secure better and more uniform aeration of the effluent.

A further object of the invention is to provide in apparatus for the continuous treatment of sewage effluent, confining channels connecting a series of compartments in which the sewage effluent is aerated; said channels having large wetted surface area in proportion to their cross-sectional area measured across the axis of flow and having said cross-sectional area reduced relative to the cross-sectional area of the connected compartments; to increase the velocity of flow in said channels and secure a scrubbing and mixing action in the effluent.

A further object of the invention is to provide in apparatus for the treatment of sewage, an increased area of effluent surface exposed to contact with air, for each volume of effluent treated.

A further object of the invention is to maintain in a continuous flow operation for sewage treatment, the desired pH control of the operation by the use of composite gas in a series of closed compartments.

A further object of the invention is to provide sprinkling means to reduce the foaming action inherent in this type of sewage purification and thereby prevent to a great extent said foam from being blown about the plant, spreading scum and germs, and making the plant walkways slippery and dangerous for plant personnel.

A further object of the invention is to provide practical means whereby apparatus now in use for sewage treatment may, without excessive cost, be reconstructed to incorporate some of the advantageous features of this invention and thus greatly improve the efficiency of their operation.

To these and other ends the characteristic features and advantages of my improvements will more fully appear in the following description and the accompanying drawings in illustration thereof.

In the drawings, in which like reference numerals designate like parts:

Figure 1:
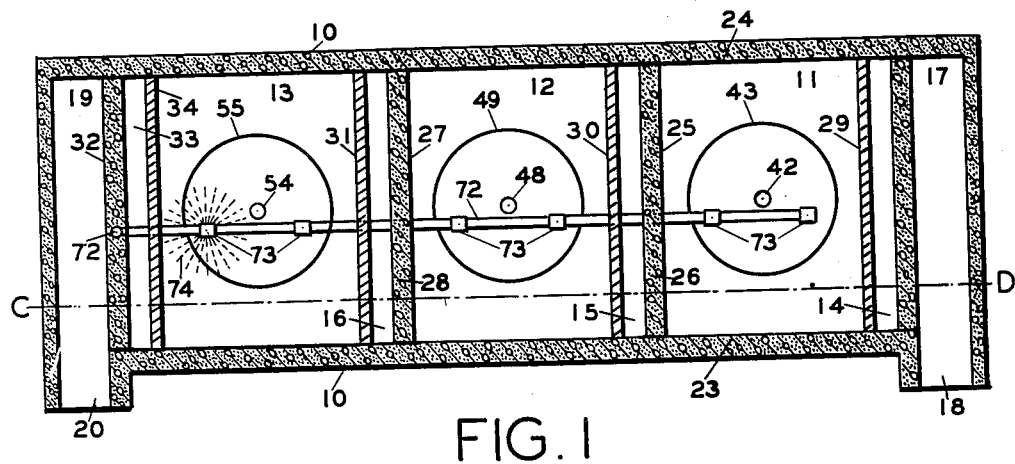
FIG. 1 is a plan view of a series of compartments, connecting channels and other apparatus coming within the scope of my invention. The plan shown in FIG. 1 is taken along the horizontal plane A—B, shown in the sectional elevation of FIG. 2.

Referring to FIG. 1, reference numeral 10 designates the structure or main frame of an apparatus constructed in accordance with one form of the invention and comprises the three compartments respectively designated as 11, 12 and 13 connected in series for the continuous flow of sewage effluent therethrough, by the vertical scrubbing channels 14, 15 and 16.

At one end of the apparatus a trough 17 is supplied through the inlet 18, with sewage effluent to be treated in this apparatus. At the opposite end of the apparatus, the treated effluent flows into a trough 19 and through the outlet 20 to a settlement basin—or it may otherwise be disposed of in accordance with customary practices in the art.

Activated sludge for "seeding" purposes may be added to the effluent as it enters the apparatus or at any point in its passage through the apparatus.

Figure 2:
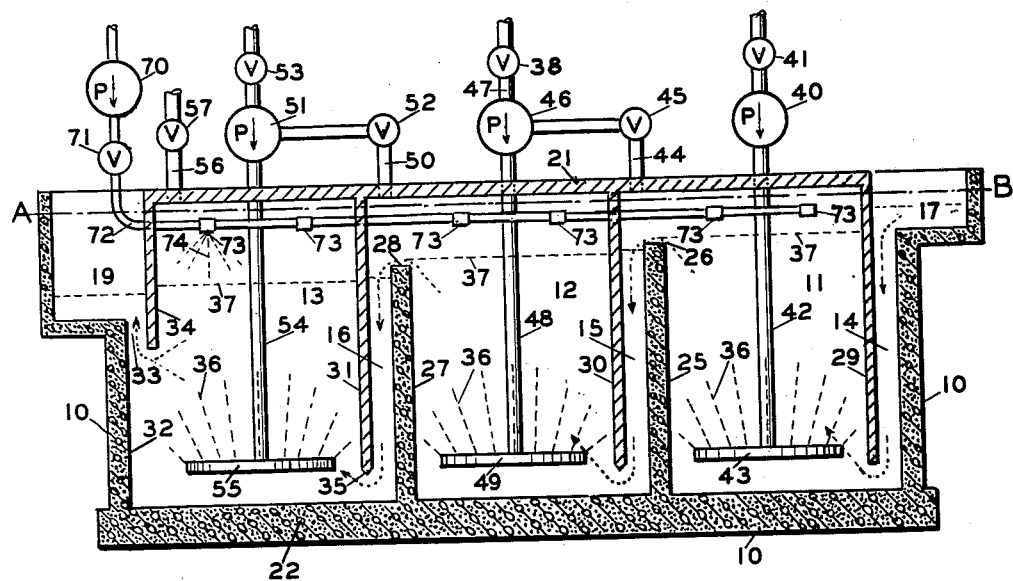
FIG. 2 is a sectional elevation of the apparatus shown in FIG. 1 and is taken along the vertical plane C—D, shown in FIG. 1.

With further reference to FIGS. 1 and 2 it will be noted that a cover 21 extends over the three compartments 11, 12 and 13. The foundation slab 22 supports the entire structure and forms the bottom of each compartment. Side walls 23 and 24 form the sides of each compartment and of each scrubbing channel.

Extending upwardly from the bottom 22 is the dam wall 25 which also extends from side wall 23 to side wall 24. The wall 25 provides an outlet dam with level apron 26 across its top, for the effluent to pass over in shallow depth as it flows into the vertical channel 15 which connects compartment 11 with compartment 12. The dam wall 25 forms an end wall for the compartment 11. In the same way the dam wall 27 having a dam with level apron 28 at the top thereof forms an end wall for the compartment 12.

The vertical channel walls 29, 30 and 31 extend from the cover 21 downwardly to a line parallel with the bottom 22 and distant therefrom to provide a lower opening from each vertical scrubbing channel into the adjacent compartment. These openings extend substantially the full width of the compartments.

It will be noted from the drawings that the vertical channels are relatively narrow, or short, in proportion to the length of the connected compartments. As shown in the drawings, the preferred proportion is to have the vertical channels, measured along the longitudinal axis of the apparatus, from one-fifth to one-tenth or less of the length of the connected compartments. Since the channels extend the full width of the apparatus it follows that the velocity of the effluent in the channels compared to the velocity in the aerating compartments will be in inverse proportion to the respective lengths. It is pointed out that the channels of restricted area are provided to accelerate the velocity of effluent flow and, because of the large area of wetted surface, they obtain an important scrubbing and mixing action in the effluent.

Compartment 11 is bounded by the bottom 22, the top 21, side walls 23 and 24, channel wall 29 and dam wall 25. Compartment 12 is bounded by the bottom 22, the top side 21, side walls 23 and 24, channel wall 30 and dam wall 27. Compartment 13 is bounded by the bottom 22, the top 21, side walls 23 and 24, channel wall 31 and end wall 32.

A channel 33 with a channel wall 34 is provided in the end compartment of the series to serve primarily as a gas trap.

The lower edge of each of the walls separating the vertical channel from the compartment into which it feeds effluent, is made thin, or relatively sharp as shown at 35. When the effluent together with any agglomerated masses of sludge formation pass under and around this sharp edge they are in most cases broken up or dispersed. This is an important feature of the invention.

As shown in FIG. 2 the sharp lower ends 35 of the channel walls 30 and 31 are formed by bevelling the bottom portion of the walls in order to provide a relatively sharp angular lower portion extending along the bottom of the wall the full width of the channel. This lower sharp angular end serves both as a fulcrum in the breaking of agglomerations of sludge and also as a sharp edge against which said agglomerations are revolved, and thus cut, shaved down and reduced in size, by the action of the effluent flowing under and around said lower end; both functions of the sharp lower ends serving to disperse said agglomerations or "bulking" in the effluent.

As the sewage flows over the outer dam with level apron which forms the outlet for each compartment, it will pass over the dam and apron in a relatively shallow stream the full width of the apparatus. In this way a large area of effluent is exposed to the air in the top of the compartment and uniform aeration of all of the effluent is obtained.

The direction arrows shown in the drawings show how the effluent is fed into the apparatus from the inlet trough 17, and flows through the channels and compartments until it is discharged through the outlet 20. It will be noted that the flow of effluent is upward through each compartment from the lower supply entrance to the upper exit over the dam wall into the adjacent channel. The upward flow of effluent is assisted by the jet effect, shown diagrammatically at 36, and the buoyancy of the air forced into each compartment by the air pumps 40, 46 and 51.

It will be noted that the continuous flow of the sewage through the apparatus will of necessity require the liquid level in each successive compartment of the series to be somewhat lower than the preceding compartment. Each compartment end wall in the direction of the flow will therefore be made a suitable distance lower to permit the flow of sewage through the apparatus. The dotted lines designated by numeral 37 show the approximate levels of the effluent in the compartments and channels when the apparatus is in operation.

As shown in FIG. 2 a pump or pressure blower 40 draws air through the throttle valve 41 from the atmosphere and forces the air through the pipe 42 into the distribution head 43. This head 43 may be of any of the well known diffusing blocks or other types used in the art. The air when discharged into the sewage effluent in compartment 11 moves upwardly through the effluent, as diagrammatically shown by the dotted lines 36, in the same direction as the effluent is moving, and gathers, together with carbon dioxide and other gases generated in the effluent, in the space at the top of the compartment 11, above the surface of the effluent. From this space the combined gases are drawn off through the pipe 44.

The pipe 44 leads through a throttle valve 45 into an air pump or blower 46 which also is provided with an auxiliary or second suction pipe 47 having a throttle valve 38 which opens to the atmosphere. The two throttle valves 45 and 38, by individual adjustment, permit the mixing in any desired proportion of combined gas drawn from compartment 11 and fresh new air drawn from the atmosphere.

From the pump 46 the gas and air mixture is forced through the pipe 48 and the diffusing head 49 into compartment 12. As described above gas and air is withdrawn in the same manner from compartment 12 through a pipe 50. A pump 51 with suction connections through throttle valves 52 and 53 takes the gaseous mixture from compartment 12 and air from the atmosphere and forces the combined gases into compartment 13 through pipe 54 and diffuser 55 in the manner described in connection with compartments 11 and 12. From compartment 13 the air and gas mixture passes off through the pipe 56 and throttle valve 57.

It will be noted from the structure described that the quantity of fresh air used in the apparatus; the proportion of generated gases re-used and the pressure maintained in each compartment can be controlled as desired by means of the air pumps, throttle valves and pipe connections described and shown. This feature of the invention is of great importance for high efficiency operation of a sewage disposal plant.

If desired, a greater depth of effluent may be maintained in the inlet trough 17 and in the outlet trough 19 and this will permit the use of higher air pressures within the compartments.

Mounted under the cover 21 is a sprinkling system to control foaming in the apparatus and prevent danger and objectionable effects of such foam which often occur in sewage disposal plants of standard design.

A suitable pump 70 is supplied with either fresh water or filtered effluent and delivers same through the valve 71 and connected pipe 72 to a series of sprinkler heads 73. These sprinkler heads are mounted over the surface of the effluent in each compartment.

Operation of the pump 70 and adjustment of the valve 71 results in the proper amount of spray from the sprinkler heads to control the foaming action inherent in the operation. The spray from one of the sprinkler heads is diagrammatically shown at 74.

In operation with the apparatus containing effluent it will be noted that the several compartments are sealed or trapped one from another so that the air and gas contents may be controlled individually in each compartment within such limits as will permit the maintenance of a continuous flow of effluent through the apparatus.

In FIGS. 1 and 2 the apparatus is shown as being comprised of three individual compartments operating in series, but it will be understood that any number of compartments may be used and many, if not all, of the features of the invention may be utilized with such a different number of compartments in use.

The outer walls and bottom of the apparatus and the end troughs are shown in the drawings as being constructed of concrete and the cover and one wall of each channel as being constructed of metal. Any other suitable material may be substituted for these parts of the apparatus.

It will be noted, by reference to FIG. 1, that the connecting channels 14, 15 and 16 are of a shape having much greater dimension transverse of the apparatus than the dimension lengthwise of the apparatus. The use of this elongated shape channel gives a much greater wetted surface than would be obtained by a near square or circular channel shape. For example, a channel 1-½ feet by 4 feet will have a cross-sectional area of six square feet and a wall perimeter of eleven feet. A channel eight inches by nine feet will have the same area of six square feet but will have a wall perimeter of over nineteen feet or 75% greater wetted wall surface.

The large wall surface area of the channels, in conjunction with the increased velocity due to the reduced cross-sectional area of the channels as specified, results in a greatly improved scrubbing and mixing action in the effluent while same is passing through the channels. This is an important feature of the invention. To obtain improved scrubbing effect in the effluent, the channel cross-section width and length should be in a ratio of approximately one to eight or more.

It will be evident that if the cover 21 over the aerating compartments 11, 12 and 13 is removed, the air pumped into the compartments cannot be re-used, but other elements of the invention will still be incorporated in the apparatus and function as described above.

It is entirely feasible to incorporate one or more of the elements herein described and claimed—for instance, scrubbing channels of suitable dimensions; surface aerating wiers and the means shown to disperse agglomerated sludge—in presently constructed compartments now used for sewage treatment and thus obtain greatly improved efficiency in their operation.

It will be noted that the entire system comprising channel walls to control the flow of effluent through the apparatus, the air diffusers, piping, pumps and valves used for aeration and the sprinkler heads, piping and pump used to control foaming of the effluent, forms a unit which can readily be made portable and may be lifted from the stationary compartments 11, 12 and 13, to enable the entire apparatus to be readily inspected and cleaned if desired, with a minimum expenditure of time and labor.

I claim:
1. An apparatus for the treatment of a continuous flow of sewage effluent comprising a series of covered compartments each provided with an aerating header; channels connecting adjacent compartments, said channels being of reduced cross-sectional area compared with the cross-sectional area of said compartments; one channel having one wall provided with a lower sharp angular end; one of said compartments having an upper outlet dam and a level discharge apron; a pump having its inlet connected through a valved pipe to the atmosphere; a valved pipe connection between the said inlet of said pump and the upper part of one compartment in said series; said pump having its outlet connected with one of said aerating headers located in a different compartment in said series than the compartment connected to the inlet of said pump and a sprinkler head, in one compartment, connected to a supply of water under pressure.

2. An apparatus for the treatment of a continuous flow of sewage effluent comprising a series of covered compartments each provided with an aerating header; channels connecting adjacent compartments, said channels being of reduced cross-sectional area compared with the cross-sectional area of said compartments; one channel having one wall provided with a lower sharp angular end; a pump having its inlet connected through a valved pipe to the atmosphere; a valved pipe connection between the inlet of said pump and the upper part of one compartment in said series, said pump having its outlet connected with one of said aerating headers located in a different compartment in said series than the compartment connected to the inlet of said pump.

3. An apparatus for the treatment of a continuous flow of sewage effluent comprising a series of covered compartments each provided with an aerating header; channels connecting adjacent compartments; said channels being positioned to provide, when said apparatus is in operation with sewage effluent, an individual gas-tight seal for each compartment, while a gas pressure in excess of atmospheric pressure is maintained in the compartments; said channels being of reduced cross-sectional area compared with the cross-sectional area of said compartments; one channel having one wall provided with a lower sharp angular end; one of said compartments having an upper outlet dam and a level discharge apron; a pump having its inlet connected through a valved pipe to the atmosphere; a valved pipe connection between said inlet of said pump and the upper part of one compartment in said series; said pump having its outlet connected with one of said aerating headers located in a different compartment in said series than the compartment connected to the inlet of said pump.

References Cited in the file of this patent

UNITED STATES PATENTS

| | | |
|---|---|---|
| 662,211 | Wiedersheim | Nov. 20, 1900 |
| 1,044,175 | Hennebutte | Nov. 12, 1912 |
| 1,286,017 | Jones | Nov. 26, 1918 |
| 1,602,052 | Smith | Oct. 5, 1926 |
| 1,732,921 | Bratton | Oct. 22, 1929 |
| 2,083,347 | Scholler et al. | June 8, 1937 |
| 2,188,847 | Streander | Jan. 30, 1940 |
| 2,216,664 | Fremd | Oct. 1, 1940 |
| 2,666,740 | Gordon | Jan. 19, 1954 |
| 2,719,032 | Schnur | Sept. 27, 1955 |

FOREIGN PATENTS

| | | |
|---|---|---|
| 450,422 | Great Britain | July 17, 1936 |
| 743,697 | Great Britain | Jan. 18, 1956 |